United States Patent [19]
Nakano et al.

[11] Patent Number: 5,986,583
[45] Date of Patent: Nov. 16, 1999

[54] VEHICLE NAVIGATOR FOR CALCULATING DISTANCE BASED ON MEAN ACCELERATION

[75] Inventors: Kenichi Nakano, Fukuoka; Kazuhiko Ikeda, Dazaifu, both of Japan

[73] Assignee: Matsushita Electric Industrial Co., Ltd., Osaka, Japan

[21] Appl. No.: 08/853,720

[22] Filed: May 9, 1997

[51] Int. Cl.$^6$ ............................................. G08G 1/123
[52] U.S. Cl. .......................... 340/988; 73/490; 701/207; 701/208
[58] Field of Search ..................... 340/988, 990, 340/995; 701/200, 207, 208, 217, 300; 73/178 R, 490; 702/165

[56] References Cited

U.S. PATENT DOCUMENTS

| | | |
|---|---|---|
| 4,357,833 | 11/1982 | Wiklund et al. .................. 340/988 |
| 5,115,238 | 5/1992 | Shimizu et al. ................... 701/217 |
| 5,267,166 | 11/1993 | Takata et al. ..................... 701/207 |
| 5,323,152 | 6/1994 | Morita .............................. 340/988 |

*Primary Examiner*—Brent A. Swarthout
*Attorney, Agent, or Firm*—Venable; Robert J. Frank

[57] ABSTRACT

In a vehicle navigator using an acceleration sensor for detecting a running distance, the precision of measuring the running distance is intended to be improved. Output data of the acceleration sensor during a predetermined time duration is stored in an output storage, and the average value or "mean acceleration" of output data is calculated by a mean acceleration calculator A running distance calculator calculates a difference between the acceleration measured with the acceleration sensor and the mean acceleration calculated by the mean acceleration calculator, and this difference is double integrated to obtain the running distance.

18 Claims, 7 Drawing Sheets

VEHICLE NAVIGATOR FOR CALCULATING DISTANCE BASED ON MEAN ACCELERATION

BACKGROUND OF THE INVENTION

1. Field of the Invention

The present invention relates to a vehicle navigator which can calculate a vehicle running distance by using output data of an accelerometer

2. Description of the Related Art

A conventional vehicle navigator will be described with reference to FIGS. 7 to 10.

Figure 7:
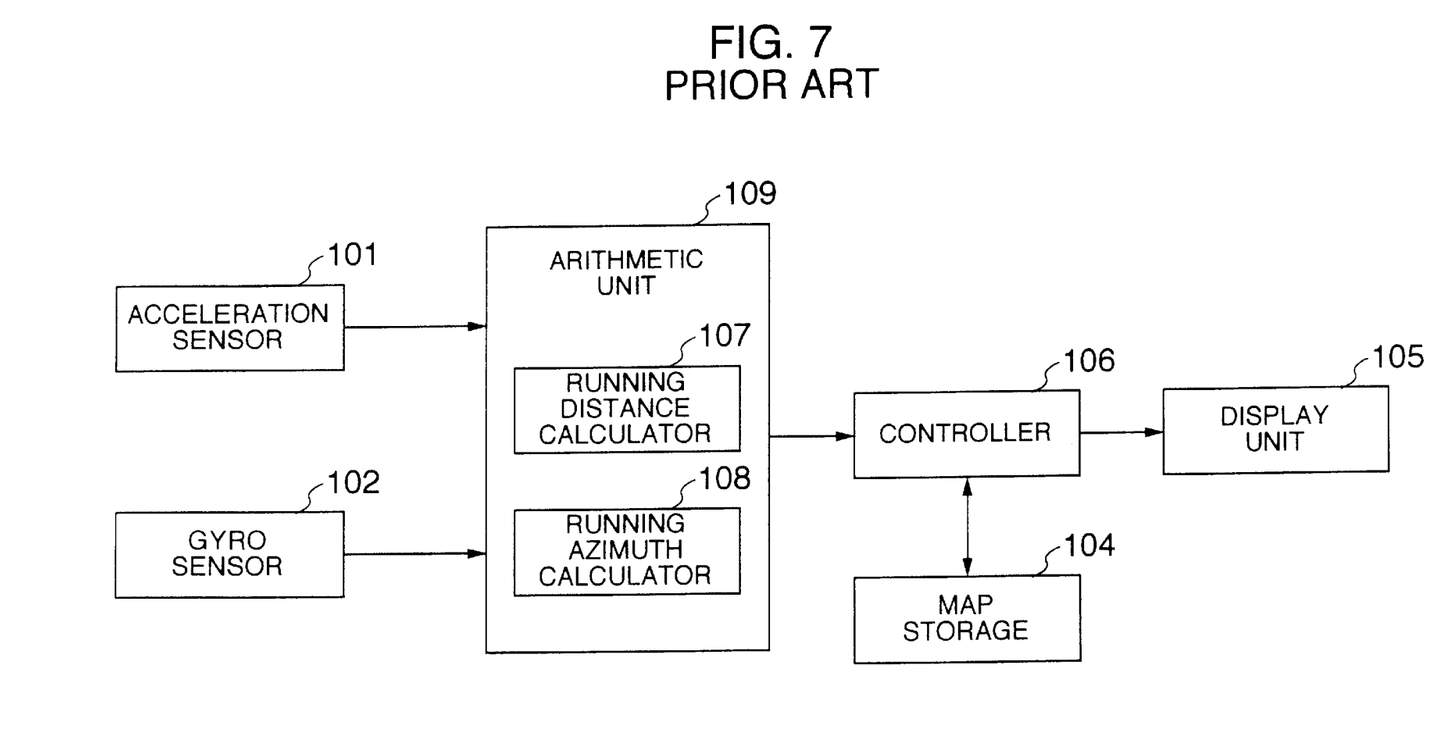
FIG. 7 is a block diagram showing the structure of a conventional vehicle navigator.

FIG. 7 is a block diagram showing the structure of a conventional vehicle navigator. In FIG. 7, reference numeral 101 represents an acceleration sensor for detecting an acceleration of a vehicle along its running direction. Reference numeral 102 represents a gyro sensor for detecting an angular velocity of a vehicle along its yawing direction. Reference numeral 107 represents a running distance calculator for calculating a vehicle running distance in accordance with output data of the acceleration sensor 10. Reference numeral 108 represents a running azimuth calculator for calculating a vehicle running azimuth in accordance with output data of the gyro sensor 102. Reference numeral 109 represents an arithmetic unit for calculating the position of a vehicle in accordance with the calculation results given by the running distance calculator 107 and the running azimuth calculator 108.

Reference numeral 104 represents a map storage for storing map data, and reference numeral 105 represents a display unit with a display screen. Reference numeral 106 represents a controller for receiving vehicle position information of the arithmetic unit 109, reading map data of a predetermined area from the map storage 104, and displaying the map data together with the position of a vehicle 100 (shown in FIG. 8) on the display unit 105.

Figure 8:
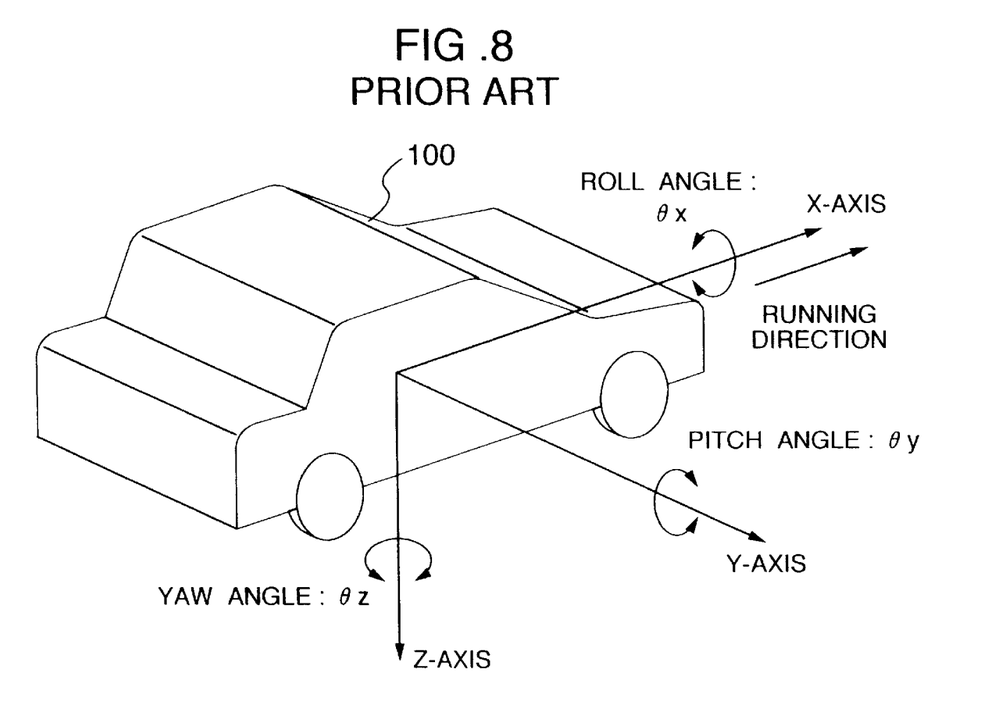
FIG. 8 is a diagram showing the coordinate system of a vehicle.

FIG. 8 shows a coordinate system of a vehicle. As shown in FIG. 8, an X-axis is along the running direction of the vehicle 100 in the horizontal plane, a Y-axis is along the direction perpendicular to the X-axis in the horizontal plane, and a Z-axis is along the gravitational direction of the vehicle 100. In the following description, the motion of the vehicle 100 about the X-axis is called as a roll operation, and an angle of the rotation of the vehicle 100 caused by the roll operation is called as a roll angle $\theta_x$. Similarly, the motion of the vehicle 100 about the Y-axis is called as a pitch operation, and an angle of the rotation of the vehicle 100 caused by the pitch operation is called as a pitch angle $\theta_y$. The motion of the vehicle 100 about the Z-axis is called as a yaw operation, and an angle of the rotation of the vehicle 100 caused by the yaw operation is called as a yaw angle $\theta_x$. The yaw angle $\theta_z$ represents a change of the running direction of a vehicle 100, and is also called as a running azimuth $\theta_z$.

The operation of determining a position of the vehicle 100 having the vehicle navigator constructed as above will be described in which the position of a vehicle 100 is calculated by the arithmetic unit 109 in accordance with output data from the acceleration sensor 101 and gyro sensor 102.

At a predetermined time interval $\Delta t$, data is output from the acceleration sensor 101 and gyro sensor 102 to the arithmetic unit 109. The arithmetic unit 109 converts output data of the acceleration sensor 101 into an acceleration $A_x(i)$ and converts output data of the gyro sensor 102 into an angular velocity $\omega_x(i)$.

First, the running distance calculator 107 supplied with the acceleration $A_x(i)$ calculates a velocity $V_x(n)$ of the vehicle 100 by the equation (1) where the velocity at time n is $V_x(n)$, the acceleration at time i is $A_x i$, a time interval of obtaining output data of the acceleration sensor 101 is $\Delta t$, and the initial velocity is $V_x(0)$.

$$V_x(n) = V_x(0) + \sum_{i=1}^{n} A_x(i) \cdot \Delta t \qquad (1)$$

As the velocity $V_x(n)$ of the vehicle 100 at the time n is calculated by the equation (1), the running distance calculator 107 calculates a running distance $\Delta D(n)$ of the vehicle at the time interval $\Delta t$ by the equation (2).

$$\Delta D(x) = V_x(n-1) \cdot \Delta t + 0.5 \cdot A_x(n) \cdot \Delta t^2 \qquad (2)$$

The running azimuth calculator 108 supplied with the angular velocity $\omega_x(i)$ calculates the running azimuth $\theta_x(n)$ of the vehicle at the time n by the equation (3).

$$\theta_z(n) = \theta(0) + \sum_{i=1}^{n} \omega_z(i) \cdot \Delta t \qquad (3)$$

Figure 9:
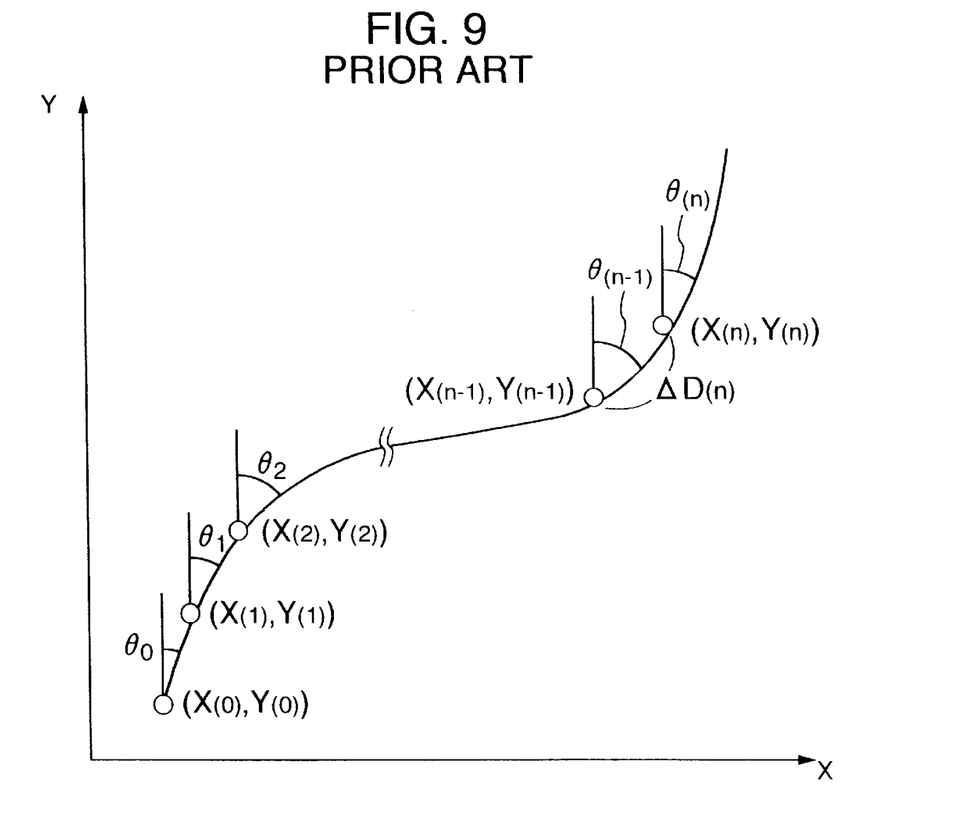
FIG. 9 is a conceptual view illustrating a calculation of the vehicle position by a vehicle navigator.

When the running distance $\Delta D(n)$ and running azimuth $\theta_x(n)$ at the time n are supplied from the running distance calculator 107 and running azimuth calculator 108 respectively, the arithmetic unit 109 executes a cumulative calculation starting from the initial position (X(0), Y(0)) as illustrated in FIG. 9 by using the equations (4) and (5), to thereby obtain the position (X(n), Y(n)) at the time n.

$$X(n) = X(0) + \sum_{i=1}^{n} \Delta D(i) \cdot \sin\theta_z(i) \qquad (4)$$

$$Y(n) = Y(0) + \sum_{i=1}^{n} \Delta D(i) \cdot \cos\theta_z(i) \qquad (5)$$

As the position (X(n), Y(n)) of the vehicle 100 is obtained, the controller 106 marks the position of the vehicle 100 on map data supplied from the map storage 104, if necessary, by converting the position of the vehicle 100 into the coordinate system of the map data, and outputs it.

Figure 10:
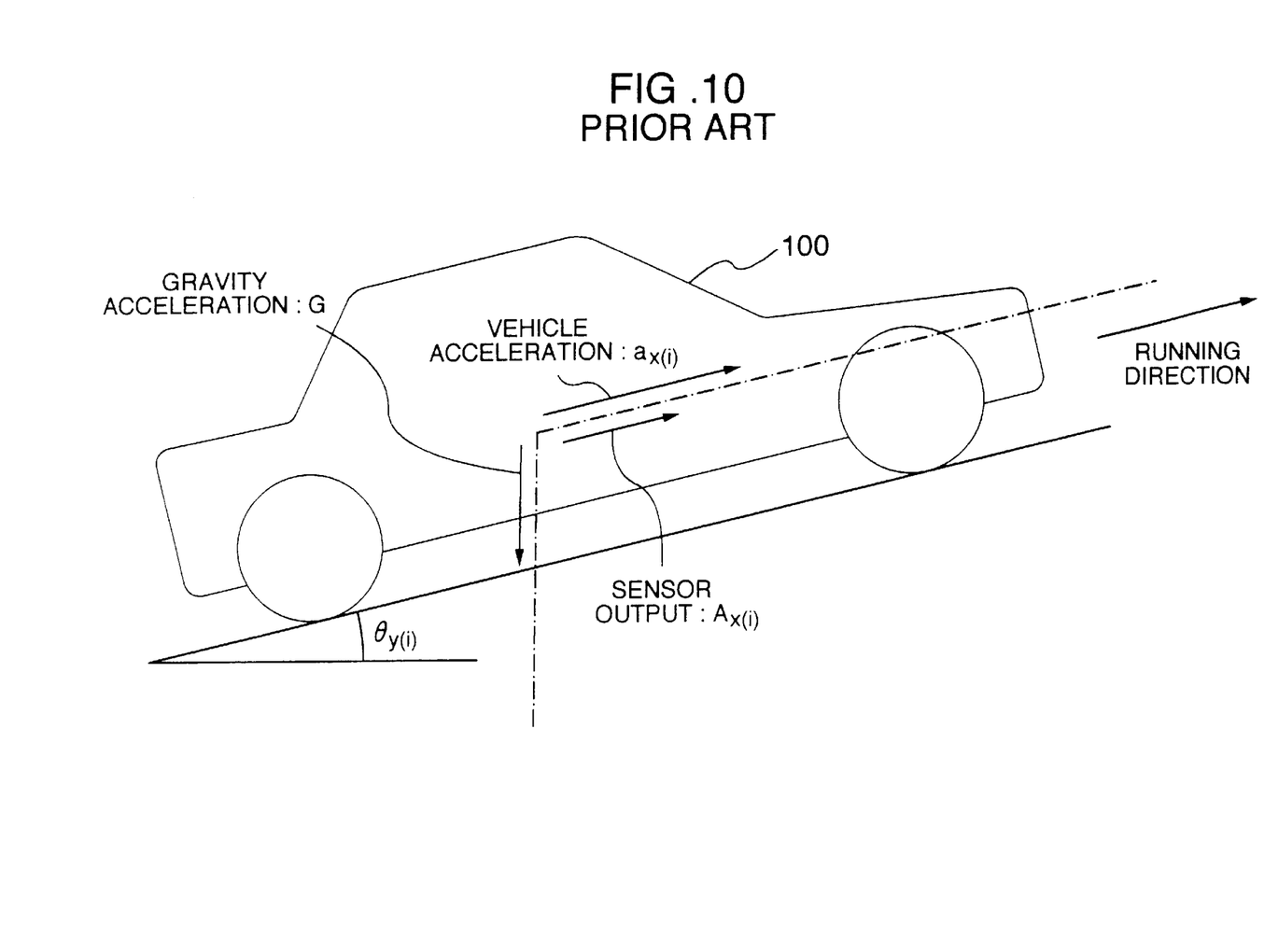
FIG. 10 is a diagram showing the running state of a vehicle on a sloped road.

With the conventional vehicle navigator as mentioned above the running distance of the vehicle 100 is calculated by using the acceleration sensor 101. However, for example, in the case of a sloped road such as shown in FIG. 10 the acceleration $A_x(i)$ detected with the acceleration sensor 101 contains the running direction component of the gravitational acceleration G in addition to an acceleration $a_x(i)$ of the vehicle 100. Therefore, a correct acceleration of the vehicle 100 cannot be obtained. From this reason, an additional acceleration sensor, gyro sensor, or the like has been used conventionally to detect the pitch angle $\theta_y(i)$ of the vehicles to calculate the running direction components of the gravitational acceleration. In this manner, the running direction component of the gravitational acceleration G is removed from the acceleration $A_x(i)$ detected with the acceleration sensor 101. With this method, however, the number of acceleration sensors or gyro sensors increases and the apparatus becomes expensive.

SUMMARY OF THE INVENTION

It is an object of the present invention to provide a vehicle navigator for calculating the position of a vehicle by using an accelerometer, capable of calculating the vehicle position at high precision with simple structure.

In order to solve the above problem, the invention provides a vehicle navigator comprising acceleration measuring means for measuring an acceleration of a vehicle; storage means for storing a plurality of output data sets output from said acceleration measuring means; mean acceleration calculation means for calculating a mean value (mean acceleration) of output data sets stored in said storage means; and running distance calculation means for calculating a running distance of the vehicle on the basis of the acceleration measured by said acceleration measuring means and the mean acceleration calculated by said mean acceleration calculation means.

Without additionally providing an expensive acceleration sensor or gyro sensor, the influence of the running direction component of the gravitational acceleration contained in output data of the acceleration measuring means can be eliminated. Accordingly, a precise running distance can be obtained with low cost.

The mean acceleration calculation means may calculate the mean acceleration as an approximate value by adding the result of multiplying the previous mean acceleration by a predetermined value to the result of multiplying an output of the acceleration measuring means by a predetermined value. In this case, it is not necessary to store output data of the acceleration measuring means in the storage means at each predetermined time. The memory capacity can be saved and the calculation speed can be improved.

DETAILED DESCRIPTION OF THE PREFERRED EMBODIMENTS

Embodiments of the invention will be described with reference to the accompanying drawings (1st Embodiment)

Figure 1:
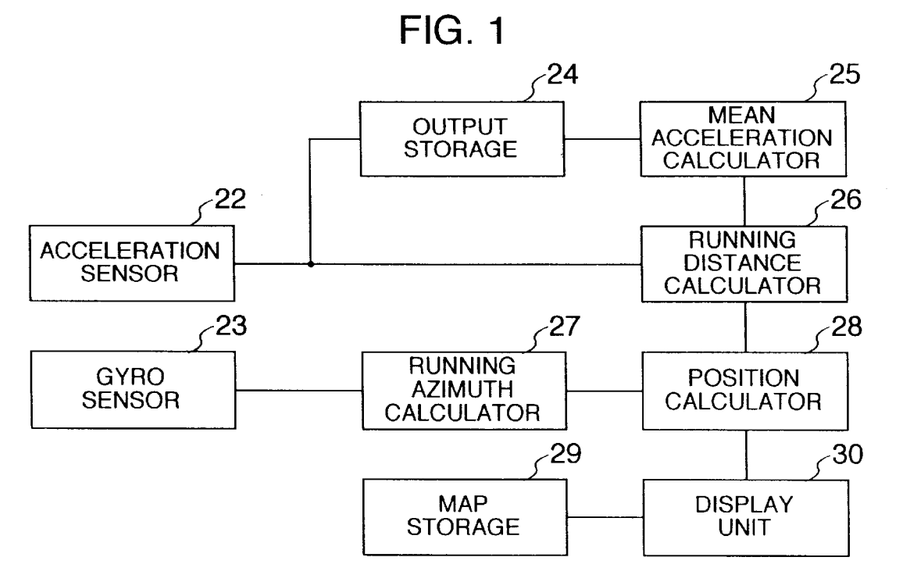
FIG. 1 is a block diagram showing the structure of a vehicle navigator according to a first embodiment of the invention.
Figure 2:
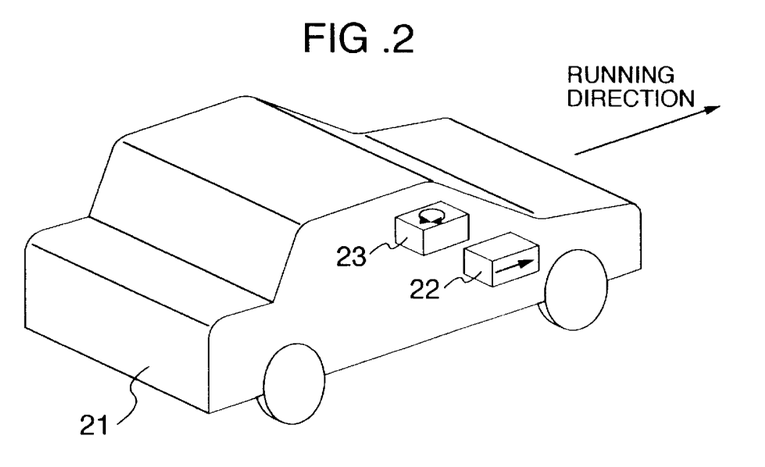
FIG. 2 is a conceptual view illustrating a mount of the vehicle navigator of the first embodiment.

FIG. 1 is a block diagram showing the structure of a vehicle navigator according to the first embodiment of the invention, and FIG. 2 is a conceptual view showing a mount of the vehicle navigator of the first embodiment.

Referring to FIGS. 1 and 2, reference numeral 21 represents a vehicle as a moving body. Reference numeral 22 represents an acceleration sensor for detecting an acceleration of a vehicle along its running direction in a non-contact manner. Reference numeral 23 represents a gyro sensor for detecting an angular velocity of a vehicle rotated by the yaw operation of the vehicle 21, i.e., rotated along the vertical axis thereof, in a non-contact manner. Reference numeral 24 represents an output storage for storing data of the acceleration sensor 22 output at a predetermined time. Reference numeral 25 represents a mean acceleration calculator for calculating a mean value of data output from the acceleration sensor 22 and stored in the output storage 24. Reference numeral 26 represents a running distance calculator for calculating a running distance of the vehicle 21 in accordance with output data of the acceleration sensor 22 and mean acceleration calculator 25. Reference numeral 27 represents a running azimuth calculator for calculating a vehicle running azimuth in accordance with output data of the gyro sensor 23. Reference numeral 28 represents a position calculator for calculating the position of the vehicle 21 in accordance with outputs of the running distance calculator 26 and running azimuth calculator. Reference numeral 29 represents a map storage for storing digital map data, and reference numeral 30 represents a display unit for displaying the vehicle position, map data, and the like.

As shown in FIG. 2, the acceleration sensor 22 and gyro sensor 23 are fixedly mounted on the vehicle 21 so that the former can detect an acceleration of the vehicle 21 along its running direction and the latter can detect an angular velocity of the vehicle 21 rotated by the yaw operation. Although the gyro sensor 23 is used for detecting the running azimuth of the vehicle 21, it is not limited only to the gyro sensor. For example, an earth magnetism sensor may be used.

The operation of the vehicle navigator constructed as above will be described.

As shown in FIGS. 1 and 2, in order to calculate the running distance of the vehicle 21, an acceleration of the vehicle 21 along its running direction is obtained and the acceleration is double integrated by the running distance calculator 26. Output data of the acceleration sensor 22 mounted on the vehicle 21 contains, in addition to the acceleration (hereinafter called "real acceleration") generated by the running of the vehicle, the running direction components of the gravitational acceleration of the earth caused by the pitch operation, roll operation, and the like of the running vehicle 21. Therefore, in order to obtain the real acceleration of the vehicle 21 along its running directions it is necessary to subtract the running direction components of the gravitational acceleration from the output of the acceleration sensor 11.

At a predetermined time interval $\Delta t$, data is output from the acceleration sensor 22 and stored in the output storage 24. The calculation of the real acceleration a(i) of the vehicle 21 at a time i will be described.

Figure 3:
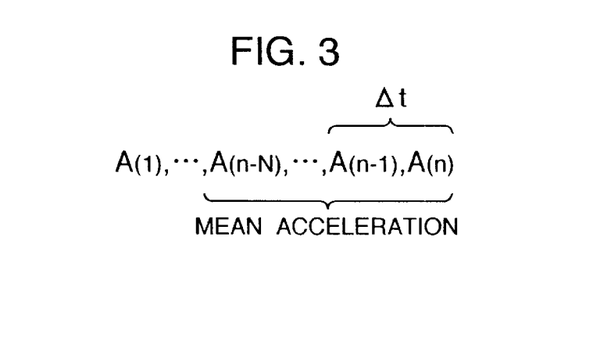
FIG. 3 is a conceptual view illustrating a mean acceleration of the first embodiment.

FIG. 3 is a conceptional diagram illustrating a mean acceleration according to the first embodiment of the invention. As shown in FIG. 3, the mean acceleration calculator 25 calculates an average value $A_{ave}(i)$ (hereinafter called "mean acceleration") of output data of the acceleration sensor 22 stored at predetermined times ($\Delta t \times N$) in the output storage 24, the output data including A(i) at time i. Assuming that the vehicle 21 repeats acceleration and deceleration generally at the same ratio at the predetermined times ($\Delta t \times N$), the mean acceleration $A_{ave}(i)$ corresponds to the average running direction components of the gravitational acceleration contained in the output of the acceleration sensor 22 at the position of the running vehicle 21.

Therefore, the running distance calculator 26 can calculate the real acceleration a(i) of the vehicle 21 along its running direction by the following equation (6), where the output of the acceleration sensor at a predetermined time (Δt×N) is A(i) and an output of the mean acceleration calculator 25 is $A_{ave}(i)$.

$$a(i)=A(i)-A_{ave}(i) \quad (6)$$

The running distance calculator 26 obtained the real acceleration a(i) along the running direction calculates the running distance ΔD(n) of the vehicle 21 by the following equations (7) and (8) where V(O) is an initial velocity, in the manner similar to the conventional method using the equations (1) and (2).

$$V(n) = V(0) + \sum_{i=1}^{n} a(i) \cdot \Delta t \quad (7)$$

$$\Delta D(n) = V(n-1) \cdot \Delta t + 0.5 \cdot a(n) \cdot \Delta t^2 \quad (8)$$

The running azimuth calculator integrates in a time axis the data output from the gyro sensor 23 at the time i to calculate the running azimuth θ(n) of the vehicle 21 by using the following equation (9), where the running azimuth at the time n is θ(n) and the angular velocity at the time i is $\omega_x(i)$, the initial azimuth angle is θ(0), and the time interval at data acquisition is Δt.

$$\theta(n) = \theta(0) + \sum_{i=1}^{n} \omega_z(i) \cdot \Delta t \quad (9)$$

When the running distance ΔD(n) is output from the running distance calculator 26 and the running azimuth θ(n) is output from the running azimuth calculator 27, the position calculator 28 calculates the present position (X(n), Y(n)) of the vehicle 21 by using the following equations (10) and (11).

$$X(n) = X(0) + \sum_{i=1}^{n} \Delta D(i) \cdot \sin\theta(i) \quad (10)$$

$$Y(n) = Y(0) + \sum_{i=1}^{n} \Delta D(i) \cdot \cos\theta(i) \quad (11)$$

In the above description, a single acceleration sensor 22 is used. The same calculations are also applicable if a plurality of acceleration sensors are used to detect the acceleration of the vehicle 21 along its running direction.

In this embodiments the output storage 24 stores data output from the acceleration sensor 22 at a predetermined time. Instead of using time as a data acquisition reference, a vehicle running distance or the like may be used as the reference timing when data is stored.

As above, according to the first embodiment, in calculating the running distance ΔD(n) of the vehicle at the time n, the mean value $A_{ave}(i)$ of output data of the acceleration sensor 22 at the predetermined times (Δt×N) is calculated and used as the running direction components of the gravitational acceleration contained in the output data of the acceleration sensor 22. By subtracting the running direction components from the output value A(i) of the acceleration sensor 22 at the time i, the gravitational acceleration error contained in the output of the acceleration sensor 22 can be eliminated and the real acceleration a(i) of the vehicle 21 can be obtained. The position of the vehicle 21 can therefore be detected at high precision with low cost, without using another sensor for obtaining the gravitational acceleration.

(2nd Embodiment)

Figure 4:
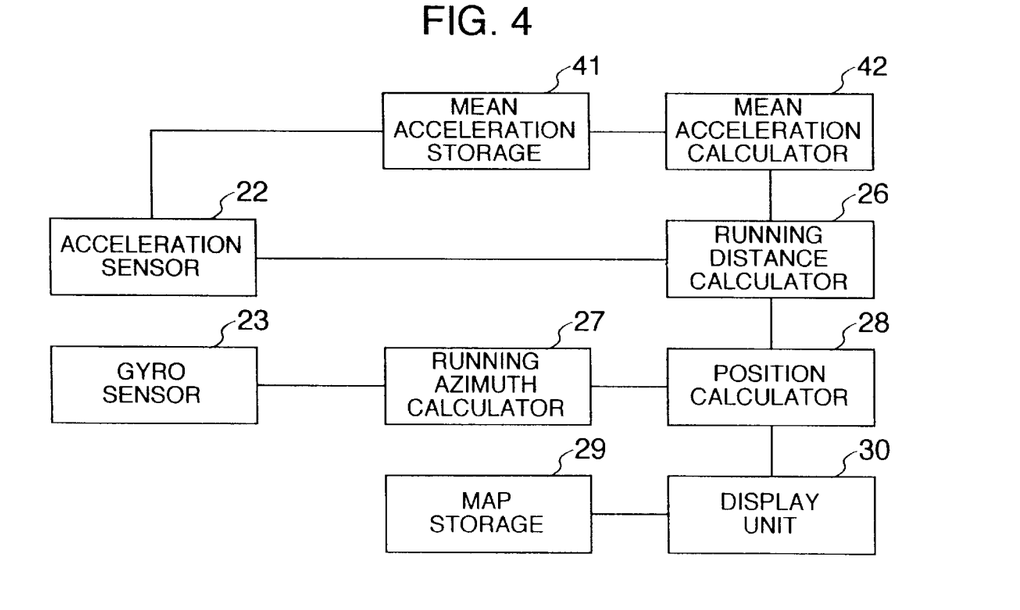
FIG. 4 is a block diagram showing the structure of a vehicle navigator according to a second embodiment of the invention.

FIG. 4 is a block diagram showing the structure of a vehicle navigator according to the second embodiment of the invention In FIG. 4, reference numeral 41 represents a mean acceleration storage for storing the previous mean acceleration, and reference numeral 42 represents a mean acceleration calculator for calculating a mean acceleration in accordance with the previous mean acceleration stored in the mean acceleration storage 41. Elements affixed with reference numerals identical to those shown in FIG. 1 have been already described in the first embodiment, and the description thereof is omitted in this embodiment.

As shown in FIG. 4, the average acceleration storage 41 stores the previous mean acceleration $A_{ave}$(i-1) In calculating the real acceleration a(i) of the vehicle 21 at the time i, the mean acceleration calculator 42 multiplies the previous mean acceleration $A_{ave}$(i-1) by a predetermined ratio (1-k). This multiplied result is added to a value obtained by multiplying the present output A(i) of the acceleration sensor 22 by a predetermined ratio k to obtain the present average acceleration $A_{ave}$(i) as an approximate value. This calculation is expressed by the following equation (12) where the output value of the acceleration sensor 22 at the time i is A(i), the previous mean acceleration is $A_{ave}$(i-1), and the ratio is k.

$$A_{ave}(i)=A_{ave}(i-1)\cdot(1-k)+A(i)\cdot k \quad (12)$$

Similar to the first embodiment, after the mean acceleration $A_{ave}(i)$ is obtained, the running distance calculator 16 calculates the real acceleration a(i) by using the equation (6).

As above, according to this embodiment, the present mean acceleration $A_{ave}(i)$ is calculated as an approximate value in accordance with the previous mean acceleration $A_{ave}$(i-1). Therefore, in calculating the mean acceleration $A_{ave}(i)$, it is not necessary to store a plurality of output values of the acceleration sensor 22 during a predetermined time duration. It is therefore possible-to save a memory capacity and improve the calculation speed.

(3rd Embodiment)

Figure 5:
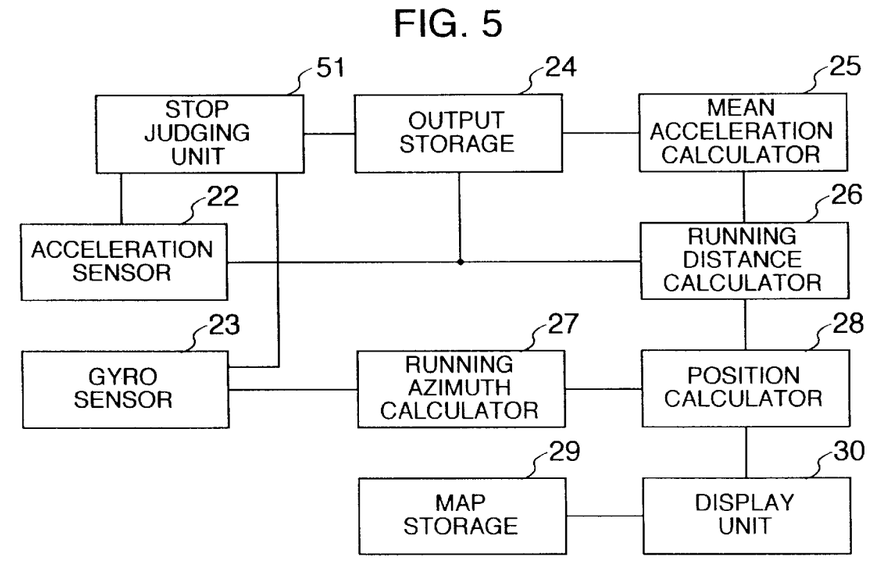
FIG. 5 is a block diagram showing the structure of a vehicle navigator according to a third of the invention.

FIG. 5 is a block diagram showing the structure of a vehicle navigator according to the third embodiment of the invention. In FIG. 5, reference numeral 51 represents a stop judging unit for judging a stop of the vehicle 21 shown in FIG. 2. In this embodiment, the stop of the vehicle is judged from a change in the output of the acceleration sensor 22 of gyro sensor 23. The other methods may also be used in judging the stop state. Elements affixed with reference numerals identical to those shown in FIG. 1 have been already described in the first embodiment, and the description thereof is omitted in this embodiment.

Consider now the stop state of the vehicle 21. Of the output data of the acceleration sensor 22 stored in the output storage 24, if the number of data sets at the stop state becomes larger, the ratio of the gravitational acceleration components at the stop position rises higher. Therefore, the mean gravitational acceleration components at the running position after a predetermined time cannot be calculated. From this reason, as shown in FIG. 5, the stop judging unit 51 for judging the stop state of the vehicle 21 is provided for judging the stop state from the output of the acceleration sensor 22 or gyro sensor 23. If the stop judging unit 51 judges that the vehicle 21 is in the stop state, the output data of the acceleration sensor 22 is inhibited to be stored in the output storage 24.

(4th Embodiment)

Figure 6:
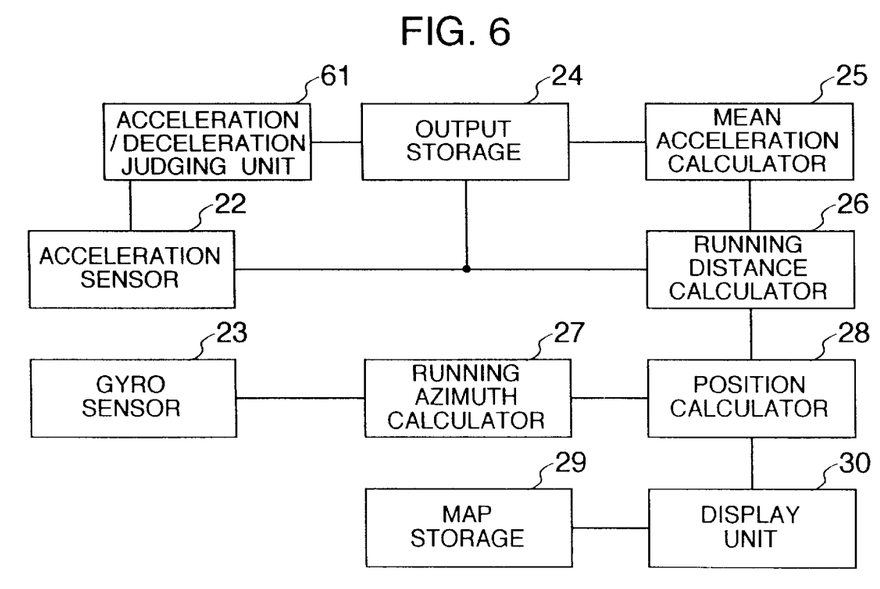
FIG. 6 is a block diagram showing the structure of a vehicle navigator according to a fourth embodiment of the invention.

FIG. 6 is a block diagram showing the structure of a vehicle navigator according to the fourth embodiment of the invention. In FIG. 6, reference numeral 61 represents an acceleration/deceleration judging unit for judging the acceleration/deceleration state of the vehicle 21 shown in FIG. 2. The acceleration/deceleration unit 61 judges a change degree or a ratio of an acceleration output from the acceleration sensor 22 during a predetermined time duration, in accordance with a difference between the maximum and minimum values of the output of the acceleration sensor 22 or in accordance with the standard deviation value of the output of the acceleration sensor 22 during the predetermined time duration. Elements affixed with reference numerals identical to those shown in FIG. 1 have been already described in the first embodiment, and the description thereof is omitted in this embodiment.

The smaller the change degree of acceleration/deceleration of the vehicle 21 is, the more the vehicle 21 runs near at the constant speed. As a results the output of the acceleration sensor 22 indicates a value near the gravitational acceleration components. If the acceleration/deceleration unit 61 judges from such principles that the change degree of acceleration/deceleration is small, the sampling time for calculating the mean acceleration by the mean acceleration calculator 25 is shortened. Conversely, if the acceleration/deceleration unit 61 judges that the change degree of acceleration/deceleration is large, the sampling time for calculating the mean acceleration by the mean acceleration calculator 25 is prolonged. In this manner, the gravitational acceleration components can be output correctly in conformity with the actual geographical topology and the running distance calculation can be made highly precise.

What is claimed is:

1. A vehicle navigator for calculating a running distance of a vehicle by measuring an acceleration of the vehicle, comprising acceleration measuring means for measuring the acceleration of the vehicle;

storage means for storing a plurality of output data sets output from said acceleration measuring means;

mean acceleration calculation means for calculating a mean value of output data sets stored in said storage means; and running distance calculation means for calculating a running distance of the vehicle on the basis of the acceleration measured by said acceleration measuring means and the mean acceleration calculated by said mean acceleration calculation means.

2. A vehicle navigator for calculating a running distance and a position of a vehicle by measuring an acceleration of the vehicles comprising:

acceleration measuring means for measuring the acceleration of the vehicle;

storage means for storing a plurality of output data sets output from said acceleration measuring means;

mean acceleration calculation means for calculating a mean value of output data sets stored in said storage means;

running distance calculation means for calculating a running distance of the vehicle on the basis of the acceleration measured by said acceleration measuring means and the mean acceleration calculated by said mean acceleration calculation means;

angular velocity measuring means for measuring an angular velocity of the vehicle;

running azimuth calculation means for calculating a running azimuth of the vehicle on the basis of the angular velocity measured by said angular velocity measuring means; and position calculation means for calculating a position of the vehicle on the basis of the calculation results by said running distance calculation means and said running azimuth calculation means.

3. A vehicle navigator according to claim 1, wherein said running distance calculation means uses as a real acceleration of the vehicle a difference between the acceleration measured by said acceleration measuring means and the mean acceleration calculated by said mean acceleration calculation means.

4. A vehicle navigator according to claim 2, wherein said running distance calculation means uses as a real acceleration of the vehicle a difference between the acceleration measured by said acceleration measuring means and the mean acceleration calculated by said mean acceleration calculation means.

5. A vehicle navigator according to claim 1, wherein said storage means stores data output from said acceleration measuring means during a predetermined time duration.

6. A vehicle navigator according to claim 2, wherein said storage means stores data output from said acceleration measuring means during a predetermined time duration.

7. A vehicle navigator according to claim 1, wherein said mean acceleration calculation means calculates the mean acceleration as an approximate value by adding the result of multiplying the previous mean acceleration by a predetermined value to the result of multiplying an output of said acceleration measuring means by a predetermined value.

8. A vehicle navigator according to claim 2, wherein said mean acceleration calculation means calculates the mean acceleration as an approximate value by adding the result of multiplying the previous mean acceleration by a predetermined value to the result of multiplying an output of said acceleration measuring means by a predetermined value.

9. A vehicle navigator according to claim 1 further comprising stop judging means for judging a stop state of the vehicle, wherein if said stop judging means judges that the vehicle is in the stop state, output data of said acceleration measuring means is inhibited to be stored in said storage means.

10. A vehicle navigator according to claim 9, wherein said stop judging means judges the stop state of the vehicle on the basis of a change of the output from said acceleration measuring means.

11. A vehicle navigator according to claim 2 further comprising stop judging means for judging a stop state of the vehicle, wherein if said stop judging means judges that the vehicle is in the stop state, output data of said acceleration measuring means is inhibited to be stored in said storage means.

12. A vehicle navigator according to claim 11, wherein said stop judging means judges the stop state of the vehicle on the basis of a change of the output from one of said acceleration measuring means and said angular velocity measuring means.

13. A vehicle navigator according to claim 1 further comprising acceleration/deceleration judging means for judging a state of acceleration/deceleration of the vehicle, wherein said mean acceleration calculation means calculates the mean acceleration by using data output from said acceleration measuring means obtained during a short time duration if said acceleration/deceleration judging means judges that the ratio of acceleration/deceleration is smaller than a predetermined value, and calculates the mean acceleration by using data output from said acceleration measuring means obtained during a long time duration if said acceleration/deceleration judging means judges that the ratio of acceleration/deceleration is larger than a predetermined value.

14. A vehicle navigator according to claim 13, wherein said acceleration/deceleration judging means judges the state of acceleration/deceleration of the vehicle on the basis of a difference between maximum and minimum values of output data of said acceleration measuring means.

15. A vehicle navigator according to claim 13, wherein said acceleration/deceleration judging means judges the state of acceleration/deceleration of the vehicle on the basis of a standard deviation value of output data of said acceleration measuring means.

16. A vehicle navigator according to claim 2 further comprising acceleration/deceleration judging means for judging a state of acceleration/deceleration of the vehicle, wherein said mean acceleration calculation means calculates the mean acceleration by using data output from said acceleration measuring means obtained during a short time duration if said acceleration/deceleration judging means judges that the ratio of acceleration/deceleration is smaller than a predetermined value, and calculates the mean acceleration by using data output from said acceleration measuring means obtained during a long time duration if said acceleration/deceleration judging means judges that the ratio of acceleration/deceleration is larger than a predetermined value.

17. A vehicle navigator according to claim 16, wherein said acceleration/deceleration judging means judges the state of acceleration/deceleration of the vehicle on the basis of a difference between maximum and minimum values of output data of said acceleration measuring means.

18. A vehicle navigator according to claim 16, wherein said acceleration/deceleration judging means judges the state of acceleration/deceleration of the vehicle on the basis of a standard deviation value of output data of said acceleration measuring means.

* * * * *

UNITED STATES PATENT AND TRADEMARK OFFICE
SUPPLEMENTAL CERTIFICATE OF CORRECTION

PATENT NO : 5,986,583
DATED : November 16, 1999
INVENTOR(S): Kenichi NAKANO et al.

It is certified that error appears in the above-identified patent and that said Letters Patent is hereby corrected as shown below:

On the title page:

--[30] Foreign Application Priority Data
May 20, 1996 [JP] Japan ..... 08-124200--.

Signed and Sealed this

Sixteenth Day of May, 2000

Attest:

Q. TODD DICKINSON

Attesting Officer

Director of Patents and Trademarks